(12) United States Patent
Benveniste

(10) Patent No.: US 8,301,955 B2
(45) Date of Patent: Oct. 30, 2012

(54) METHOD AND APPARATUS PERFORMING EXPRESS RETRANSMISSION OF FRAMES

(75) Inventor: Mathilde Benveniste, South Orange, NJ (US)

(73) Assignee: Avaya Inc., Basking Ridge ( * ) Notice: Subject to any disclaimer, the term of this patent is extended or adjusted under 35 U.S.C. 154(b) by 1009 days.

(21) Appl. No.: 12/277,383

(22) Filed: Nov. 25, 2008
(Under 37 CFR 1.47)

(65) Prior Publication Data

US 2010/0131815 A1    May 27, 2010

Related U.S. Application Data

(60) Provisional application No. 61/021,231, filed on Jan. 15, 2008.

(51) Int. Cl.
*H04L 1/18* (2006.01)
(52) U.S. Cl. .......... 714/749; 714/748; 714/776
(58) Field of Classification Search .......... 714/776, 714/748, 749
See application file for complete search history.

(56) References Cited

U.S. PATENT DOCUMENTS

| | | | | |
|---|---|---|---|---|
| 2003/0091066 A1* | 5/2003 | Choi et al. | | 370/468 |
| 2004/0160930 A1* | 8/2004 | Choi et al. | | 370/338 |
| 2004/0233876 A1* | 11/2004 | Nakashima et al. | | 370/338 |
| 2007/0110092 A1* | 5/2007 | Kangude et al. | | 370/448 |
| 2007/0237169 A1* | 10/2007 | Trainin et al. | | 370/458 |
| 2008/0222478 A1* | 9/2008 | Tamaki | | 714/749 |
| 2009/0129309 A1* | 5/2009 | Thubert et al. | | 370/315 |
| 2009/0154436 A1* | 6/2009 | Choi et al. | | 370/338 |

OTHER PUBLICATIONS

Pang et al. "Improvement of WLAN Contention Resolution by Loss Differentiation." IEEE Trans. on Wireless Comm., vol. 5, No. 12, Dec. 2006.*

* cited by examiner

*Primary Examiner* — Philip Guyton
(74) *Attorney, Agent, or Firm* — Anderson Goreck & Rouille LLP

(57) ABSTRACT

A method, apparatus and computer program product for the express forwarding are presented. A node attempts to transmit a frame designated as a Time Sensitive Quality of Service (TSQ) frame to be express forwarded from a first node to a second node of a plurality of nodes. A collision is detected involving the TSQ frame while attempting to transmit the TSQ frame. A retransmission of the TSQ frame is attempted without waiting a predetermined back off period.

14 Claims, 6 Drawing Sheets

METHOD AND APPARATUS PERFORMING EXPRESS RETRANSMISSION OF FRAMES

CROSS REFERENCE TO RELATED APPLICATIONS

The present application claims the benefit of U.S. Provisional Patent Application No. 61/021,231, filed on Jan. 15, 2008; which is incorporated herein by reference in its entirety.

BACKGROUND

Wireless Local Area Networks (WLANS) have become ubiquitous. Growth in demand for Wireless Local Area Networks (WLANs) is driving the development of new technology to provide higher throughput. To a greater extent this growth is due to the increased number of users and applications desiring wireless transmission and to a lesser extent to the emergence of new applications needing higher transmission rates along a single connection between two points.

In wireless Local Area Networks (LANs), a wireless channel can be reserved for the transmission of a single frame or of a sequence of frames, known as a TXOP (transmit opportunity), while employing asynchronous distributed random channel access methods, as described in the 2007 802.11 standard, which includes the 11e amendment, where the TXOP was introduced, the IEEE Std 802.11™-2007, (Revision of IEEE Std 802.11-1999), and the Wireless LAN Medium Access Control (MAC) and Physical Layer (PHY) Specifications.

In such an environment, both the source and destination of the transmission broadcast the reservation duration in order to establish the interference neighborhood. A TXOP is a sequence of frames transmitted between a pair of nodes following a single contention for the channel. A TXOP holder, the node initiating the TXOP, may transmit contention-free after the first transmission to the Responder, which is the node receiving the frames in the TXOP.

To date, there are two basic ways of reserving the channel for a TXOP in wireless LANs. One method of performing reservation is by utilizing Frame-by-frame reservation. According to the 802.11 distributed channel access MAC protocol, RTS/CTS frames are used to notify neighbors of the start of the reservation. Alternatively, the first frame of a TXOP has its duration field set to a time interval long enough to reserve the channel for the transmission of the following frame. The reservation time is extended on a frame-by-frame basis, by updating the length of the reservation with each data frame and the acknowledgement that follows. A consequence of frame-by-frame reservation is that, if the reservation is denied, it does not require cancellation.

Another method of performing reservation in wireless LANS is by utilizing Start-to-finish reservation. If it is not be possible to extend the time of channel reservation on a frame-by-frame basis, the channel must be reserved for the entire sequence of transmissions, start to finish, at the time of the reservation request, and, if the reservation request is denied, or if time remains reserved at the completion of transmission, the reservation must be cancelled.

A start-to-finish reservation applies to any combination of nodes (i.e. mesh points/APs/stations). A node reserves a channel to cover an entire sequence of transmissions, directed to either one or various different destinations, possibly including responses from the destinations. If the reservation is not authorized, or when the transmission sequence is completed, the reserving node releases the remaining reservation time by canceling the reservation.

To avoid collisions, each node keeps a NAV for a traffic channel, which is set according to the received reservation requests and responses. A NAV is defined as a time period a node must refrain from transmitting on a traffic channel. It is maintained by each station and is updated by the Duration field value of received transmissions, which may serve as TXOP reservation requests or responses to reservation requests. A reservation request from the transmissions source is either granted or denied by the destination, and notice is sent to the source. The response contains in the Duration field the remaining reservation duration in order to notify the neighbors of the destination node. Applications for wireless networks include Voice Over Internet Protocol (VoIP), and multimedia (Voice and/or Video), together referred to as VoIP/multimedia. VoIP/multimedia applications require a certain Quality of Service (QoS) in order to maintain sufficient quality of the communication. Latency can be an issue for VoIP/multi-media. Meeting QoS requires short total end-to-end over-the-air delays. The 802.11e amendment to the IEEE 802.11 standard, which is incorporated in the 2007 revision of the standard, provides mechanisms for reducing the over-the-air delays from transmissions in a wireless LAN. These are single hop transmissions. The 802.11e mechanisms may not be adequate for meeting latency requirements in wireless networks involving multiple-hop transmissions. Wireless mesh networks are such networks. A wireless mesh may be an Ad hoc mode mesh (not attached to a wired network) or an infrastructure mode mesh (attached to a wired network). In general, both traffic with source and destination in the mesh and traffic bound from/to a wired network may co-exist on a mesh. The latency/jitter limit for voice traffic traversing the wired network is lower (40 to 50 milliseconds) than that for traffic staying on the wireless mesh (175-200 milliseconds). A mesh will involve multiple-hop flows. The mesh backbone network is a multi-hop network. The multi-hop path delay will be at least a multiple of the single hop delay. Wireless meshes operating on a single channel have novel collision behavior that can impact nearby the latency experienced end to end, over the air. The prevalence of hidden nodes and the interaction of contention-based access with multi-hop flows impose latency increases on both mesh and nearby WLANs beyond what non-mesh experience suggests. Hidden nodes remain hidden after retrial, and their transmissions are dropped. The high correlation of sequentially forwarded frames on a multi-hop flow cause excessive delays to transmissions that have been involved in a collision. For backward compatibility, and for the contention-based access protocol to continue to be used, remedies are needed on the mesh side. For QoS traffic, multi-hop delay must meet the same latency constraints as single-hop delay. We describe remedies to reduce over-the-air latency. The goal is to reduce the delay experienced on the longest multi-hop path by forwarding frames along a multi-hop path fast.

Retransmission of a failed transmission typically involves back off using a wider contention window. By way of express retransmission, a frame is retransmitted by dispensing with back off and transmitting after Short Inter-Frame Space (SIFS) following an ACKTimeout. An express forwarded frame is less likely to collide on retransmission because of its prioritization. Only a first retransmission attempt receives priority treatment in order to prevent two express-forwarded frames from repeatedly colliding.

SUMMARY

One way to reduce delay in a wireless mesh is by providing capacity provisioning. The nodes and links of the mesh network must have sufficient capacity to prevent traffic buffer from building up anywhere in the network. Proper provisioning involves the use of multiple radios at nodes of high traffic concentration to match traffic profiles.

Another way to reduce delay in wireless mesh is by providing congestion control. Reducing transmit rate and rerouting traffic can alleviate congestion, given the provisioning. Even with proper provisioning, the stochastic nature of traffic may produce short-term fluctuations which may cause congestion at certain nodes.

MAC layer prioritized transmission of forwarded QoS traffic across the mesh helps reduce end-to-end delay along a multi-hop path, given congestion control and capacity provisioning. For fast forwarding, QoS traffic would require top priority access when forwarded on a multi-hop path. Lower priority access would be used for all other traffic. EDCA offers access prioritization on a single channel. Further prioritization is not possible with EDCA, however. Higher-priority 802.11e traffic (VO/VI) already uses the top-priority access category. A different mechanism is needed for forwarded QoS traffic.

Conventional mechanisms such as those explained above suffer from a variety of deficiencies. Embodiments of the invention significantly overcome such deficiencies and provide mechanisms and techniques that provide for express forwarding of frames designated as time-sensitive QoS (TSQ) frames.

In a particular embodiment of a method for providing express retransmission of frames the method includes attempting to transmit a frame designated as a Time Sensitive Quality of Service (TSQ) frame to be express forwarded from a first node to a second node of the plurality of nodes. The method further includes detecting a collision involving the TSQ frame while attempting to transmit the TSQ frame. Additionally, the method includes attempting retransmission of the TSQ frame without waiting a predetermined back off period.

Other embodiments include a computer readable medium having computer readable code thereon for providing express retransmission of frames. The computer readable medium includes instructions for attempting to transmit a frame designated as a Time Sensitive Quality of Service (TSQ) frame to be express forwarded from a first node to a second node of the plurality of nodes. The computer readable medium further includes instructions for detecting a collision involving the TSQ frame while attempting to transmit the TSQ frame. Additionally, the computer readable medium includes instructions for attempting retransmission of the TSQ frame without waiting a predetermined back off period.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides express retransmission as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing express forwarding as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Express forwarding is a technique used to reduce delay for a designated frame along a multi-hop path by insuring that a forwarding node incurs less delay than single-hop transmissions. For a single-channel mesh forwarding delay is reduced by reserving the channel for a forwarded transmission for a sufficiently long time interval to enable the next forwarding node to seize the channel. Immediate access is thus given to nodes, other than the first node on a multi-hop path, forwarding QoS traffic.

A frame to be express forwarded is designated as a time-sensitive QoS (TSQ) transmission. A special flag may be used to mark a transmission as express forwarded, depending on the criteria for a TSQ transmission and/or the information available along its path. The TSQ designation may be supplied by the application, for example, a TSQ frame could be a frame of a specified user priority (e.g. VO). Alternatively, the TSQ designation may also be supplied by the originating node, for example, if there is differentiation between ad hoc and infrastructure traffic, all voice frames starting or destined to the portal would be designated TSQ by the originating node. The TSQ designation can further be used for other criteria.

In order to process an express forwarded frame, a known time increment DTO is added to the value of the Duration field when a TSQ frame is forwarded. The Duration field of the ACK (if any) returned for the TSQ frame received at the destination node is set based on the Duration field of the received frame. All nodes that hear the transmission other than the receiving node set their NAV according to the Duration field of the received transmission. If the receiving node forwards the frame, it subtracts DTO from the Duration value of a received frame before setting its NAV, and attempts transmission of the received TSQ frame when acknowledgement of receipt of the TSQ frame is complete. DTO should be sufficiently long to enable a forwarding node to process the received frame and prepare it for transmission on the next hop. It must be at least a time slot long.

Figure 1:
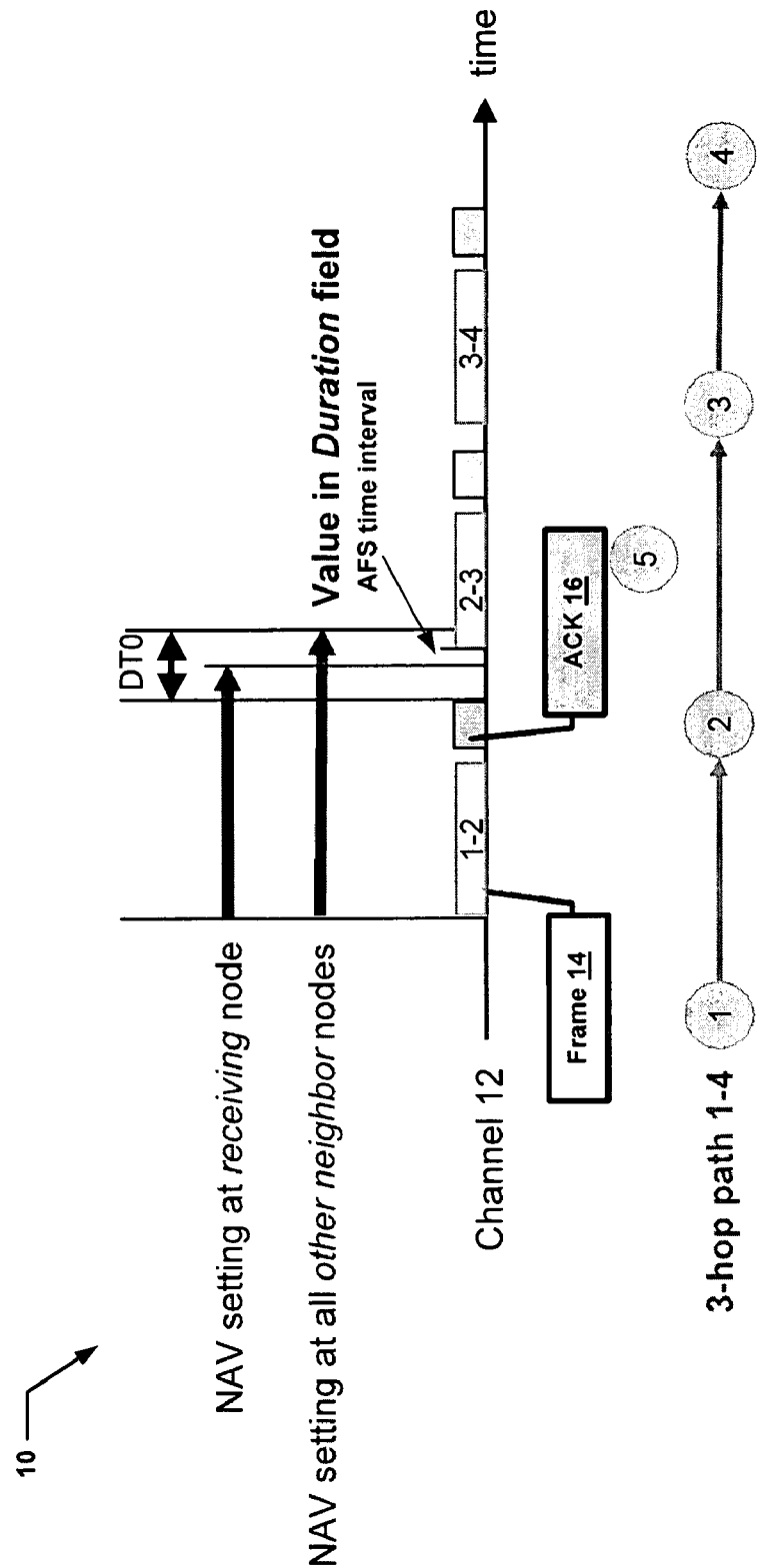
FIG. 1 is a diagram showing the timing of an express forwarded frame among several nodes is shown.

Referring now to FIG. 1, a diagram 10 showing the timing of an express forwarded frame among several nodes is shown. Nodes 1-5 are shown, with a three-hop path for an express forwarded frame traversing from node 1 to node 2, node 2 to node 3 and then node 3 to node 4. Node 5 is a non-forwarding neighbor node. Each node maintains a NAV for the channel 12. A first frame 14 is designated as an express forwarded frame, to be forwarded from node 1 to node 2. The Duration field is set at value longer than usual when a frame is transmitted to a forwarding node of a multi-hop path. The forwarding nodes, 2 and 3, transmit when they complete acknowledgment of the received frame. In an alternative embodiment of this invention, the forwarding nodes, 2 and 3, adjust the Duration value on the received frame by subtracting the increment when setting their NAV. The non-forwarding neighbor nodes—e.g. node 5—sets its NAV by the received Duration field. Thus, node 2, as the intended recipient of the forwarded frame does not set its NAV. Accordingly, node 2 will have access to channel 12 before node 5 does, and the frame will be forwarded more quickly, since node 2 can access the channel before node 5 and forward the frame. Thus, node 2 may transmit when transmission and acknowledgment are completed, whereas the NAV at node 5, which was set to the value of the Duration field, has the value DTO when the received frame has been acknowledged.

Contention is reduced when forwarding a TSQ frame for all forwarding nodes other than the first node on path. Neighbor nodes have their NAV still set to at least one time slot when the new forwarding node is ready to transmit (barring any independent NAV-setting request); thus they will not contend for the channel, letting that node transmit before any of them.

A forwarding node may perform Controlled Channel Access (CCA) before attempting transmission. This avoids collisions with another node that has not heard the received TSQ transmission to set the NAV accordingly. If the channel is busy, the forwarding node backs off a delay from a short contention window CWmin(EF).

TXOPs allow multiple frames to be transmitted with a single contention. TXOPs can be used together with express forwarding. The combination reduces contention and collisions along the forwarding path. The Duration field value on each frame of a TXOP to be forwarded is increased by DTO. A TXOP may contain exclusively TSQ frames, or a mix of frames, some to be express forwarded and other not. The frames to be express forwarded are flagged as TSQ. Preferably the TSQ frames of a TXOP should be transmitted before the non-TSQ frames in order to reduce the processing delay of the TSQ frames at the receiving node and thus enable their immediate forwarding. All TSQ frames in a given TXOP shall be transmitted to the same node. The Duration field on the ACK (if any) for each of the TXOP frames received at the destination node is set based on received frame. The receiving node will be able to transmit immediately following the completion and acknowledgment of the TXOP. Forwarding of the frames in the received TXOP starts when the NAV expires, which occurs once the entire TXOP has been received and acknowledged. Forwarding of the frames in the received TXOP may involve the segregation of the frames into different TXOPs according to the next hop destination node. Frames buffered at the receiving node in the same access category as the received TXOP may be transmitted in the forwarded TXOPs, provided such frames are sent to the same node as the forwarded TXOP and the size of the augmented TXOP does not exceed the TXOP limit for the access category.

RTS/CTS is the mechanism for reducing the impact of hidden terminals, which are common in a wireless mesh. RTS/CTS protection may be used in conjunction with express forwarding. The combination reduces contention and collisions on the forwarding path. The RTS of a time-sensitive QoS frame is flagged TSQ and the Duration field on the RTS is increased by the increment DTO. The node to which the RTS is addressed responds with a CTS with Duration value set based on the Duration field of the received RTS. If the node receiving the RTS must forward the RTS-protected frame(s), it does so upon acknowledgement of the RTS-protected frame(s). Forwarding of the received frame or TXOP starts when the NAV expires, which occurs once the frame or TXOP has been received and acknowledged. The express forwarding mechanism works even when the receiving node is not required to observe its NAV after acknowledging receipt of a frame. Express forwarding gives priority access to frames marked TSQ over all other traffic.

Figure 2:
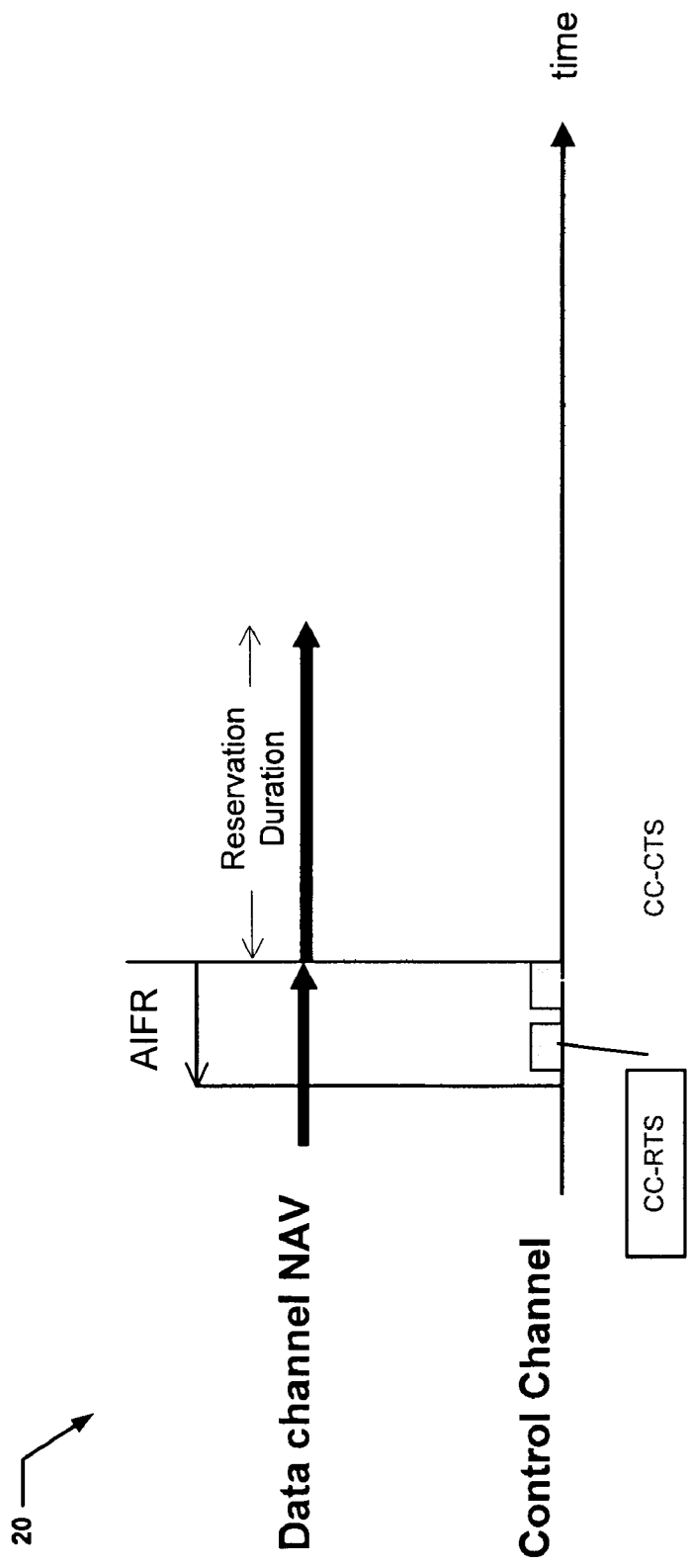
FIG. 2 is a diagram showing the timing of multi-channel express forwarding is shown.

Another embodiment involves multi-channel express forwarding. An example is shown in the environment 20 of FIG. 2. When attempting to send a CC-RTS on the Control Channel, a node may not transmit or decrement the back off delay if the data channel being reserved is busy, unless the channel's NAV is due to expire within a time interval equal to AIFR (advance interval for reservation). When responding to a CC-RTS with a CC-CTS, a node must decline the reservation if the indicated data channel is busy, unless the channel's NAV is due to expire within a time interval equal to (AIFR−RTS_Tx Time) [RTS_Tx Time is the transmit time of a CC-RTS]. The length of AIFR depends on the access priority of the CC-RTS/CC-CTS. A longer AIFR is used for a higher access priority.

Figure 3:
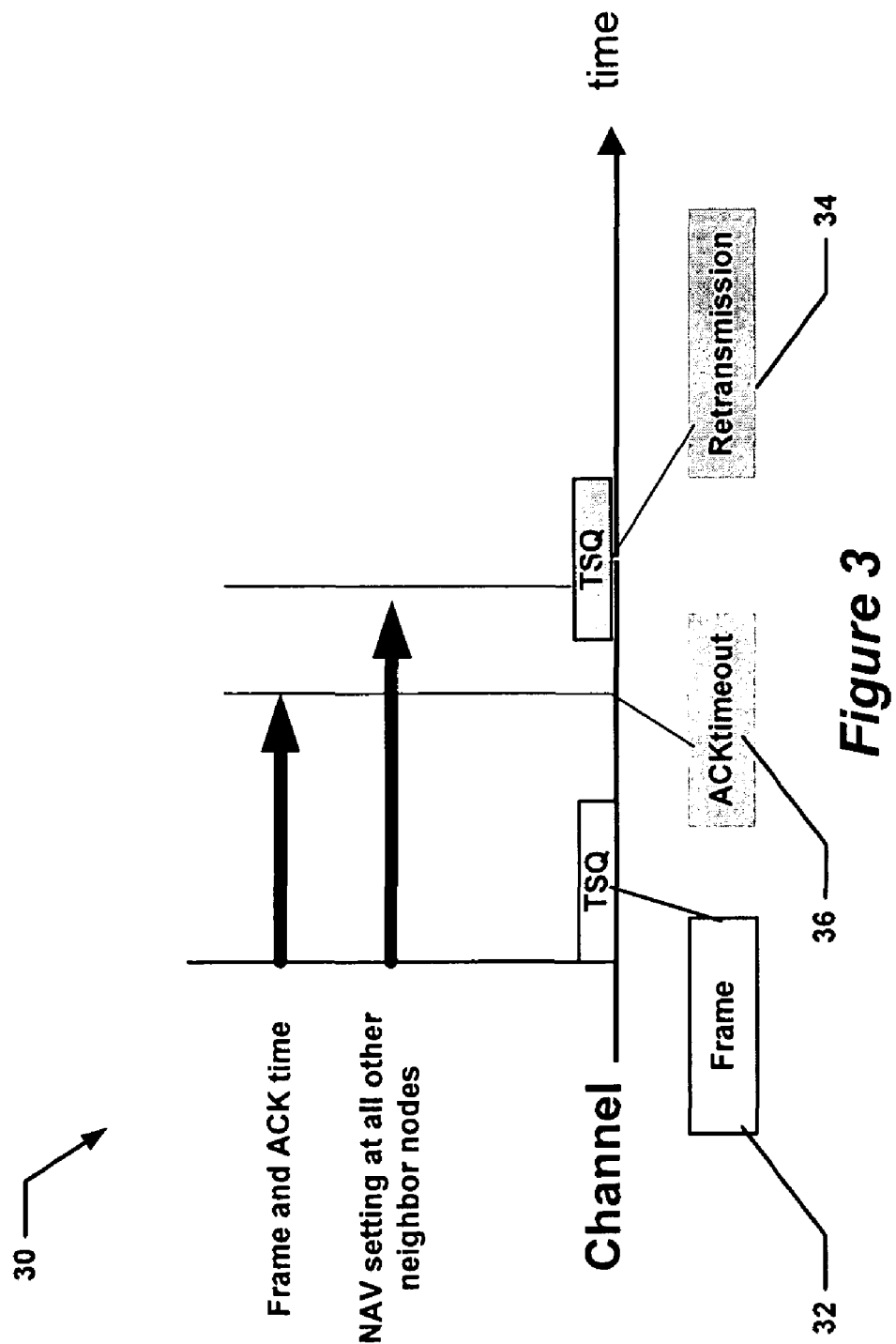
FIG. 3 is a diagram showing express retransmission of frames in accordance with embodiments of the invention.

FIG. 3 is a diagram showing express retransmission of frames in accordance with embodiments of the invention. A first frame 32 is designated as an express forwarded (TSQ) frame, to be forwarded from a first node to a second node. The forwarded TSQ frame 32 collides with another frame while attempting the transmission from the first node to the second node. This results in a retransmission 34 of the TSQ frame 32. The first time a collision occurs, the frame is retransmitted without waiting a predetermined back off period. If there is a subsequent collision, the frame is retransmitted after waiting a pre-determined back off period. This retransmission may occur after an acknowledgment (ACK) timeout 36.

Figure 4:
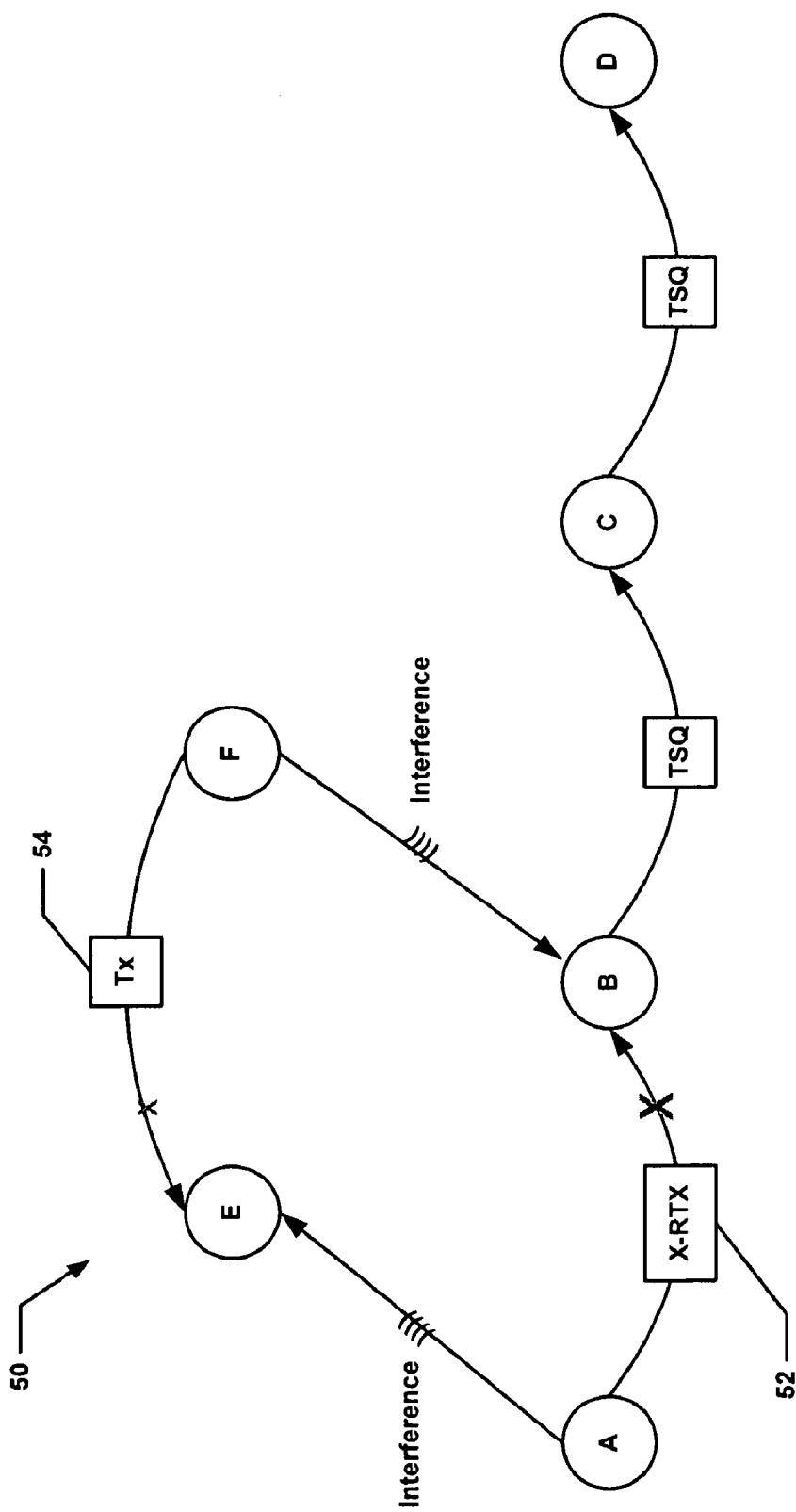
FIG. 4 is a block diagram of an environment showing express retransmission of a frame in a wireless Local Area Network (WLAN)

Referring now to FIG. 4, an illustration of express retransmission is shown. The use of express retransmission enables a multi-hop transmission to complete faster. FIG. 4 shows an environment 50 wherein express forwarding and express retransmission take place on a single-channel mesh. A conventional (e.g., non-express forwarded) frame 54 is being transmitted from node F to node E at the same time an express forwarded frame 52 is being transmitted from node A to node B. These transmissions lead to hidden terminal collisions. Node A's transmission of frame 52 causes interference at node E for frame 54, while node F's transmission of frame 54 cause interference at node B for frame 52.

Express retransmission enables the TSQ frame 52 to be express retransmitted from node A to node B (while node F waits a predetermined contention back off period). Thus, express retransmitted frame 52 is successfully retransmitted from node A to node B. Further, the ACKs sent by node B and node C protect the frame is it is forwarded on to node D. In such a manner, an express forwarded frame is given transmission priority over a non-express forded frame in the event of a collision.

Figure 5:
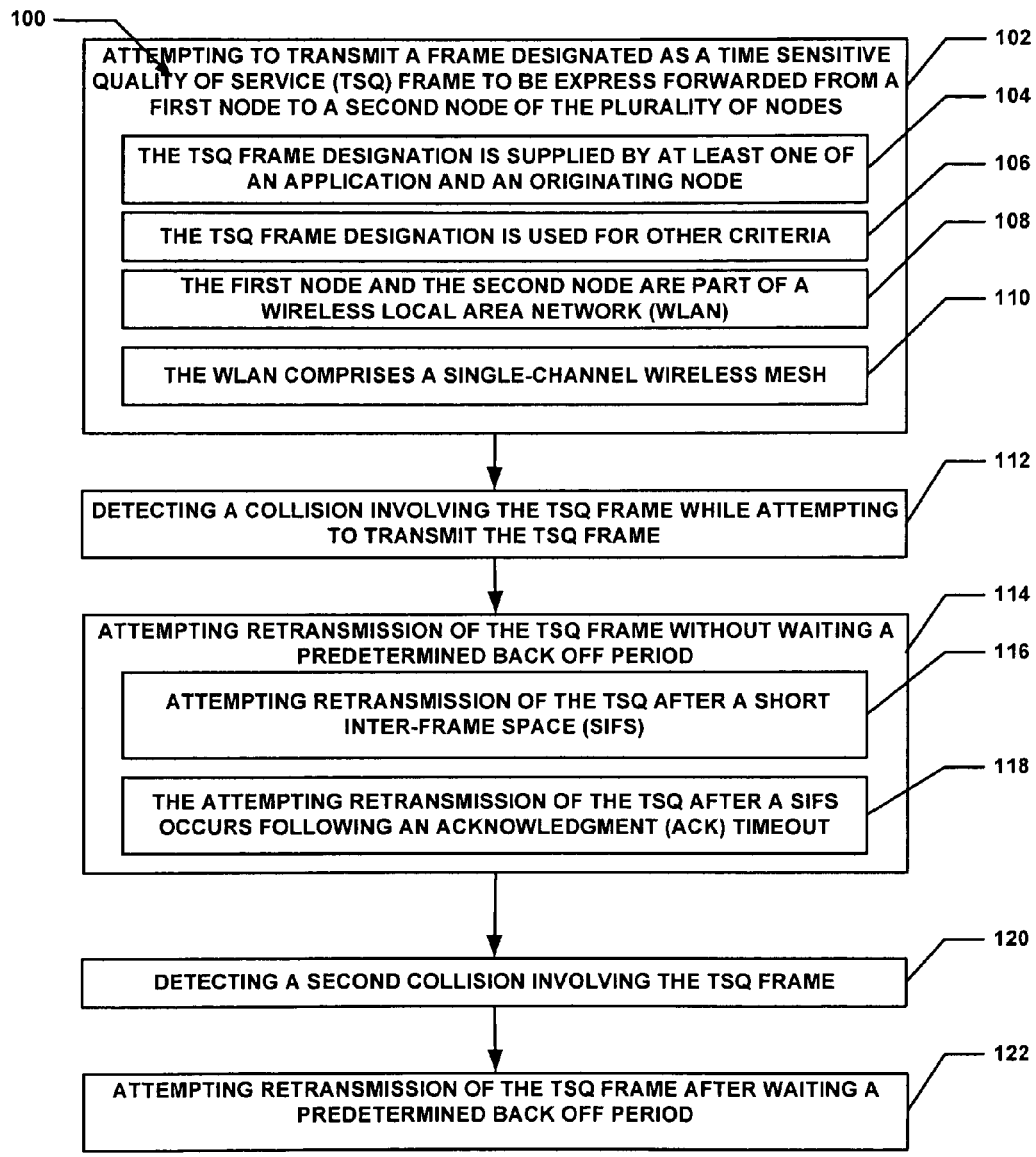
FIG. 5 a flow diagram of a particular embodiment of a method of performing express retransmission in accordance with embodiments the invention.

A flow diagram of a particular embodiment of the presently disclosed method is depicted in FIG. 5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Thus, unless otherwise stated the steps described below are unordered meaning that, when possible, the steps can be performed in any convenient or desirable order.

Referring now to FIG. 5, a particular embodiment of a method 100 for performing express retransmission of express forwarded frames is shown. Method 100 begins with processing block 102 which discloses attempting to transmit a frame designated as a Time Sensitive Quality of Service (TSQ) frame to be express forwarded from a first node to a second node of the plurality of nodes. As shown in processing block 104 the TSQ frame designation is supplied by at least one of an application and an originating node. Processing block 106 states the TSQ frame designation is used for other criteria. Processing block 108 recites the first node and the second node are part of a Wireless Local Area Network (WLAN). As further stated in processing block 110, the WLAN may comprise a single-channel wireless mesh.

Processing block 112 discloses detecting a collision involving the TSQ frame while attempting to transmit the TSQ frame. A collision occurs when two nodes attempt to transmit at the same time.

Processing block 114 states attempting retransmission of the TSQ frame without waiting a predetermined back off period. During normal operation, when two nodes transmissions collide, each node waits a period of time (referred to as a back off time) before attempting retransmission. The back off time varies for each node, so the same two nodes are not continuously colliding. In this event, the node transmitting the TSQ frame retransmits immediately and does not wait the back-off period, thereby giving the TSQ frame priority over the frame that was attempted that caused the collision. As shown in processing block 116, the attempting retransmission of the TSQ frame without waiting a predetermined back off period comprises attempting retransmission of the TSQ after a Short Inter-Frame Space (SIFS). As further shown in processing block 118, the attempting retransmission of the TSQ after a SIFS occurs following an acknowledgment (ACK) timeout.

Processing continues with processing block 120 which recites detecting a second collision involving the TSQ frame. Thus there was another collision. This could be from another node attempting to transmit or could be the same node which previously collided with this frame (also attempting to transmit a TSQ frame).

Processing block 122 discloses attempting retransmission of the TSQ frame after waiting a predetermined back off period. Once a first collision occurred, in order to avoid continuous collusion with another node attempting to retransmit a TSQ frame, the conventional action of waiting a predetermined back off period is used.

Figure 6:
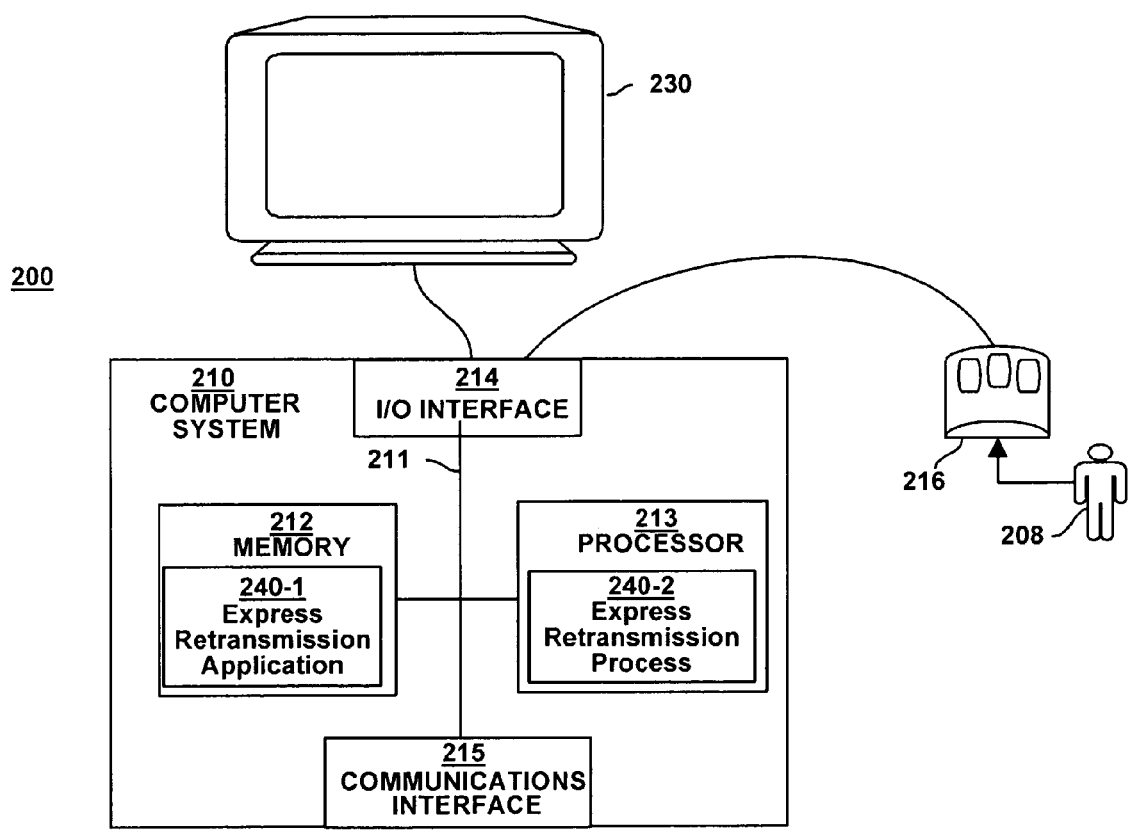
FIG. 6 illustrates an example computer system architecture for a computer system that performs express retransmission in accordance with embodiments of the invention.

FIG. 6 is a block diagram illustrating example architecture of a computer system 210 that executes, runs, interprets, operates or otherwise performs an express retransmission application 240-1 and express retransmission process 240-2 suitable for use in explaining example configurations disclosed herein. The computer system 210 may be any type of computerized device such as a personal computer, workstation, portable computing device, console, laptop, network terminal or the like. An input device 216 (e.g., one or more customer/developer controlled devices such as a keyboard, mouse, etc.) couples to processor 213 through I/O interface 214, and enables a customer 208 to provide input commands, and generally control the graphical customer interface 260 that the express retransmission application 240-1 and process 240-2 provides on the display 230. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with an express retransmission application 240-1 as explained herein. The express retransmission application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a express retransmission application 240-1. Execution of an express retransmission application 240-1 in this manner produces processing functionality in the express retransmission process 240-2. In other words, the express retransmission process 240-2 represents one or more portions or runtime instances of an express retransmission application 240-1 (or the entire express retransmission application 240-1) performing or executing within or upon the processor 213 in the computerized device 210 at runtime.

It is noted that example configurations disclosed herein include the express retransmission application 240-1 itself (i.e., in the form of un-executed or non-performing logic instructions and/or data). The express retransmission application 240-1 may be stored on a computer readable medium (such as a floppy disk), hard disk, electronic, magnetic, optical, or other computer readable medium. An express retransmission application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a express retransmission application 240-1 in the processor 213 as the express retransmission process 240-2. Those skilled in the art will understand that the computer system 210 may include other processes and/or software and hardware components, such as an operating system not shown in this example.

A display 230 need not be coupled directly to computer system 210. For example, the express retransmission application 240-1 can be executed on a remotely accessible computerized device via the network interface 215. In this instance, the graphical customer interface 260 may be displayed locally to a customer 208 of the remote computer, and execution of the processing herein may be client-server based.

During operation, processor 213 of computer system 200 accesses memory system 212 via the interconnect 211 in order to launch, run, execute, interpret or otherwise perform the logic instructions of the express retransmission application 240-1. Execution of express retransmission application 240-1 produces processing functionality in express retransmission process 240-2. In other words, the express retransmission process 240-2 represents one or more portions of the express retransmission application 240-1 (or the entire application) performing within or upon the processor 213 in the computer system 200.

It should be noted that, in addition to the express retransmission process 240-2, embodiments herein include the express retransmission application 240-1 itself (i.e., the un-executed or non-performing logic instructions and/or data).

The express retransmission application 240-1 can be stored on a computer readable medium such as a floppy disk, hard disk, or optical medium. The express retransmission application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of express retransmission application 240-1 in processor 213 as the express retransmission process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
   attempting to transmit a frame designated as a Time Sensitive Quality of Service (TSQ) frame to be express forwarded from a first node to a second node of said plurality of nodes;
   detecting a collision involving said TSQ frame while attempting to transmit said TSQ frame; and
   providing priority treatment to said TSQ frame by attempting retransmission of said TSQ frame without waiting a predetermined back off period, wherein said attempting retransmission of said TSQ frame without waiting a predetermined back off period comprises attempting retransmission of said TSQ after a Short Inter-Frame Space (SIFS), wherein said attempting retransmission of said TSQ after a SIFS occurs following an acknowledgment (ACK) timeout, and wherein only a first retransmission attempt receives said priority treatment to prevent two express forwarded frames from continuously colliding.

2. The method of claim 1 further comprising:
   detecting a second collision involving said TSQ frame; and
   attempting retransmission of said TSQ frame after waiting a predetermined back off period.

3. The method of claim 1 wherein said TSQ frame designation is supplied by at least one of an application and an originating node.

4. The method of claim 1 wherein said TSQ frame designation is used for other criteria.

5. The method of claim 1 wherein said first node and said second node are part of a Wireless Local Area Network (WLAN).

6. The method of claim 5 wherein said WLAN comprises a single-channel wireless mesh.

7. A non-transitory computer readable medium having computer readable code thereon for providing express retransmission of frames, the medium comprising:
   instructions for attempting to transmit a frame designated as a Time Sensitive Quality of Service (TSQ) frame to be express forwarded from a first node to a second node of said plurality of nodes;
   instructions for detecting a collision involving said TSQ frame while attempting to transmit said TSQ frame; and
   instructions for providing priority treatment to said TSQ frame by attempting retransmission of said TSQ frame without waiting a predetermined back off period, wherein said attempting retransmission of said TSQ frame without waiting a predetermined back off period comprises attempting retransmission of said TSQ after a Short Inter-Frame Space (SIFS), wherein said attempting retransmission of said TSQ after a SIFS occurs following an acknowledgment (ACK) timeout, and wherein only a first retransmission attempt receives said priority treatment to prevent two express forwarded frames from continuously colliding.

8. The computer readable medium of claim 7 further comprising:
   instructions for detecting a second collision involving said TSQ frame; and
   instructions for attempting retransmission of said TSQ frame after waiting a predetermined back off period.

9. The computer readable medium of claim 7 further comprising instructions wherein said TSQ frame designation is supplied by at least one of an application and an originating node.

10. The computer readable medium of claim 7 further comprising instructions wherein said TSQ frame designation is used for other criteria.

11. A computer system comprising:
    a memory;
    a processor;
    a communications interface;
    an interconnection mechanism coupling the memory, the processor and the communications interface; and
    wherein the memory is encoded with an express retransmission application that when performed on the processor, provides an express retransmission process for processing information, the express retransmission process causing the computer system to be capable of performing the operations of:
    attempting to transmit a frame designated as a Time Sensitive Quality of Service (TSQ) frame to be express forwarded from a first node to a second node of said plurality of nodes;
    detecting a collision involving said TSQ frame while attempting to transmit said TSQ frame; and
    providing priority treatment to said TSQ frame by attempting retransmission of said TSQ frame without waiting a predetermined back off period, wherein said attempting retransmission of said TSQ frame without waiting a predetermined back off period comprises attempting retransmission of said TSQ after a Short Inter-Frame Space (SIFS), wherein said attempting retransmission of said TSQ after a SIFS occurs following an acknowledgment (ACK) timeout, and wherein only a first retransmission attempt receives said priority treatment to prevent two express forwarded frames from continuously colliding.

12. The computer system of claim 11 further comprising: detecting a second collision involving said TSQ frame; and attempting retransmission of said TSQ frame after waiting a predetermined back off period.

13. The computer system of claim 11 wherein said TSQ frame designation is supplied by at least one of an application and an originating node.

14. The computer system of claim 11 wherein said TSQ frame designation is used for other criteria.

\* \* \* \* \*